United States Patent [19]

Rosinski et al.

[11] 3,876,523
[45] Apr. 8, 1975

[54] CATALYST FOR RESIDUA DEMETALATION AND DESULFURIZATION

[75] Inventors: Edward J. Rosinski, Deptford; Thomas R. Stein; Ronald H. Fischer, both of Cherry Hill, all of N.J.

[73] Assignee: Mobil Oil Corporation, New York, N.Y.

[22] Filed: Aug. 29, 1973

[21] Appl. No.: 392,730

[52] U.S. Cl. .............. 208/89; 208/216; 208/251 H
[51] Int. Cl. ............................................ C10g 23/02
[58] Field of Search .......... 208/216, 89, 251 H, 210

[56] References Cited
UNITED STATES PATENTS

| | | | |
|---|---|---|---|
| 3,630,888 | 12/1971 | Alpert et al. | 208/216 |
| 3,666,685 | 5/1972 | O'Hara | 208/251 H |
| 3,712,861 | 1/1973 | Rosinski et al. | 208/216 |
| 3,714,032 | 1/1973 | Bertolacini et al. | 208/216 |
| 3,770,617 | 11/1973 | Riley et al. | 208/216 |
| 3,785,967 | 1/1974 | van Klinken | 208/216 |
| 3,814,683 | 6/1974 | Christman et al. | 208/216 |
| 3,819,509 | 6/1974 | Wolk et al. | 208/216 |

*Primary Examiner*—Delbert E. Gantz
*Assistant Examiner*—G. J. Crasanakis
*Attorney, Agent, or Firm*—Charles A. Huggett; Michael G. Gilman

[57] ABSTRACT

Demetalation and desulfurization of residual petroleum oil is carried out with hydrogen and with an alumina base catalyst incorporating a Group VI-B and a Group VIII metal. The catalyst has at least 60% of its pore volume in pore diameters within the range of 100–200 Angstroms, at least 5% of its pore volume is in pore diameters greater than 500 Angstroms, at least 5% of its pore volume is in pore diameters less than 40 Angstroms and the surface area of the catalyst is 40–150 m²/g, preferably a surface area up to about 110 m²/g.

7 Claims, 6 Drawing Figures

CATALYST DESULFURIZATION ACTIVITY FOR HYDROPROCESSING
KUWAIT ATMOSPHERIC RESIDUA (3.9 WT% SULFUR, 51 ppm Ni+V)
2000 psig — 0.75 LHSV

CATALYST FOR RESIDUA DEMETALATION AND DESULFURIZATION

BACKGROUND OF THE INVENTION

1. Field of the Invention

This invention relates to demetalation and desulfurization of petroleum oils, preferably those containing residual hydrocarbon components, and having a significant metals and sulfur content. More particularly the invention relates to a demetalation-desulfurization process for reducing high metals and sulfur contents of petroleum oils, again preferably those containing residual hydrocarbon components, by the use of catalytic compositions that are especially effective for such a purpose.

2. Description of the Prior Art

Residual petroleum oil fractions such as those heavy fractions produced by atmospheric and vacuum crude distillation columns, are typically characterized as being undesirable as feedstocks for most refining processes due primarily to their high metals and sulfur content. The presence of high concentrations of metals and sulfur and their compounds precludes the effective use of such residua as chargestocks for cracking, hydrocracking and coking operations as well as limiting the extent to which such residua may be used as fuel oil. Perhaps the single most undesirable characteristic of such feedstocks is the high metals content. Principal metal contaminants are nickel and vanadium, with iron and small amounts of copper also sometimes present. Additionally, trace amounts of zinc and sodium are found in some feedstocks. As the great majority of these metals when present in crude oil are associated with very large hydrocarbon molecules, the heavier fractions produced by crude distillation contain substantially all the metal present in the crude, such metals being particularly concentrated in the asphaltene residual fraction. The metal contaminants are typically large organo-metallic complexes such as metal porphyrins and asphaltenes.

At present, cracking operations are generally performed to petroleum fractions lighter than residua fractions. Such cracking is commonly carried out in a reactor operated at a temperature of about 800° to 1,500°F, a pressure of about 1 to 5 atmospheres, and a space velocity of about 1 to 1000 WHSV. Typical cracking chargestocks are coker and/or crude unit gas oils, vacuum tower overhead etc., the feedstock having an API gravity range of between about 15 to about 45. As these cracking chargestocks are lighter than residual hydrocarbon fractions, residual fractions being characterized as having an API gravity of less than about 20, they do not contain significant proportions of the heavy and large molecules in which the metals are concentrated.

When metals are present in a cracking unit chargestock such metals are deposited on the cracking catalyst. The metals act as a catalyst poison and greatly decrease the efficiency of the cracking process by altering the catalyst so that it promotes increased hydrogen production.

The amount of metals present in a given hydrocarbon stream is generally judged by petroleum engineers by making reference to a chargestock's "metals factor". This factor is equal to the summation of the metals concentration in parts per million of iron and vanadium plus 10 times the amount of nickel and copper in parts per million. The factor may be expressed in an equation form as follows:

$F_m = Fe + V + 10 (Ni + Cu)$ A chargestock having a metals factor greater than 2.5 is indicative of a chargestock which will poison cracking catalyst to a significant degree. A typical Kuwait atmospheric crude generally considered of average metals content, has a metals factor of about 75 to about 100. As almost all of the metals are combined with the residual fraction of a crude stock, it is clear that metals removal of 90% and greater will be required to make such fractions (having a metals factor of about 150 to 200) suitable for cracking chargestocks.

Sulfur is also undesirable in a process unit chargestock. The sulfur contributes to corrosion of the unit mechanical equipment and creates difficulties in treating products and flue gases. At typical cracking conversion rates, about one half of the sulfur charged to the unit is converted to $H_2S$ gas which must be removed from the light gas product, usually by scrubbing with an amine stream. A large portion of the remaining sulfur is deposited on the cracking catalyst itself. When the catalyst is regenerated, at least a portion of this sulfur is oxidized to form $SO_2$ and/or $SO_3$ gas which must be removed from the flue gas which is normally discharged into the atmosphere.

Such metals and sulfur contaminants present similar problems with regard to hydrocracking operations which are typically carried out on chargestocks even lighter than those charged to a cracking unit, and thus typically having an even smaller amount of metals present. Hydrocracking catalyst is so sensitive to metals poisoning that a preliminary or first stage is often utilized for trace metals removal. Typical hydrocracking reactor conditions consist of a temperature of 400° to 1,000°F and a pressure of 100 to 3,500 p.s.i.g.

In the past, and to a limited extent under present operating schemes, high molecular weight stocks containing sulfur and metal have often been processed in a coker to effectively remove metals and also some of the sulfur the contaminants remaining in the solid coke. Coking is typically carried out in a reactor or drum operated at about 800° to 1100°F temperature and a pressure of one to ten atmospheres wherein heavy oils are converted to lighter gas oils, gasoline, gas and solid coke. However, there are limits to the amount of metals and sulfur that can be tolerated in the product coke if it is to be saleable. Hence, there is considerable need to develop economical as well as efficient means for effecting the removal and recovery of metallic and non-metallic contaminants from various fractions of petroleum oils so that conversion of such contaminated charges to more desirable product may be effectively accomplished. The present invention is particularly concerned with the removal of metal contaminants from hydrocarbon materials contaminated with the same. Also of concern is the removal of sulfur contaminants from the contaminated hydrocarbon fractions.

It has been proposed to improve the salability of high sulfur content, residual-containing petroleum oils by a variety of hydrodesulfurization processes. However, difficulty has been experienced in achieving an economically feasible catalytic hydrodesulfurization process, because notwithstanding the fact that the desulfurized products may have a wider marketability, the manufacturer may be able to charge little or no additional premium for the low sulfur desulfurized products, and since hydrodesulfurization operating costs have tended to be relatively high in view of the previously experienced, relatively short life for catalysts used in hydrodesulfurization of residual-containing stocks. Short catalyst life is manifested by inability of a catalyst to maintain a relatively high capability for desulfurizing chargestock with increasing quantities of coke and/or metallic contaminants which act as catalyst poisons. Satisfactory catalyst life can be obtained relatively easily with distillate oils, but is especially difficult to obtain when desulfurizing petroleum oils containing residual components, since the asphaltene or asphaltic components of an oil, which tend to form disproportionate amounts of coke, are concentrated in the residual fractions of a petroleum oil, and since a relatively high proportion of the metallic contaminants that normally tend to poison catalysts are commonly found in the asphaltene components of the oil.

An objective of this invention is to provide means for the removal of metal and/or sulfur contaminants from petroleum oils. A further objective of this invention is to provide means for the removal of metal and/or sulfur contaminants from residual hydrocarbon fractions. Another objective of this invention is to provide a method whereby hydrocarbon fractions having a significant metal and/or sulfur contaminant content may be demetalized in order to produce suitable cracking, hydrocracking or coking unit chargestock. An objective of this invention is to provide means for the removal of sulfur contaminants from petroleum oils. A further objective of this invention is to provide a method whereby hydrocarbon fractions having a significant metal and/or sulfur contaminant content may be demetalized in order to produce a suitable fuel oil or fuel oil blend stock. Other and additional objectives of this invention will become obvious to those skilled in the art following a consideration of the entire specification including the drawings and claims.

SUMMARY OF THE INVENTION

A hydrodemetalation-desulfurization class of catalysts comprising a hydrogenating component (cobalt and molybdenum in a preferred embodiment) composited with a refractory base (alumina in a preferred embodiment), said composite catalyst having not less than 60% of the volume of the pores having a diameter within the range of about 100–200A, not less than about 5% of the volume of the pores being greater than 500A in diameter, and having a surface area of about 40 to 150 m$^2$/g has been discovered. In a preferred embodiment the catalyst is further categorized as having not less than 5% of the volume of the pores less than about 40A in diameter and having a surface of about 110 m$^2$/g or less.

While not wishing to be bound by any particular theory of operability, it is postulated that while the majority of the utility of this invention's catalyst is produced by the high concentration of pores within the 100–200A range, a certain percentage of large pores (>500A) are required for exceptionally large metal and sulfur containing molecules, and to a lesser extent a certain percentage of small pores (<40A) are required primarily for enhanced sulfur removal.

A metal and/or sulfur containing hydrocarbon chargestock is contacted with a catalyst of the class of this invention under a hydrogen pressure of about 500 to 3,000 p.s.i.g. and a hydrogen circulation rate of about 1,000 to 15,000 s.c.f./bbl of feed, and at about 600° to 850°F temperature and 0.1 to 5.0 L.H.S.V. When higher desulfurization is desired the preferred operating conditions are more severe: 725° to 850°F, a hydrogen pressure of 2,000 to 3,000, and a space velocity of 0.10 to 1.5 L.H.S.V.

Figure 4:
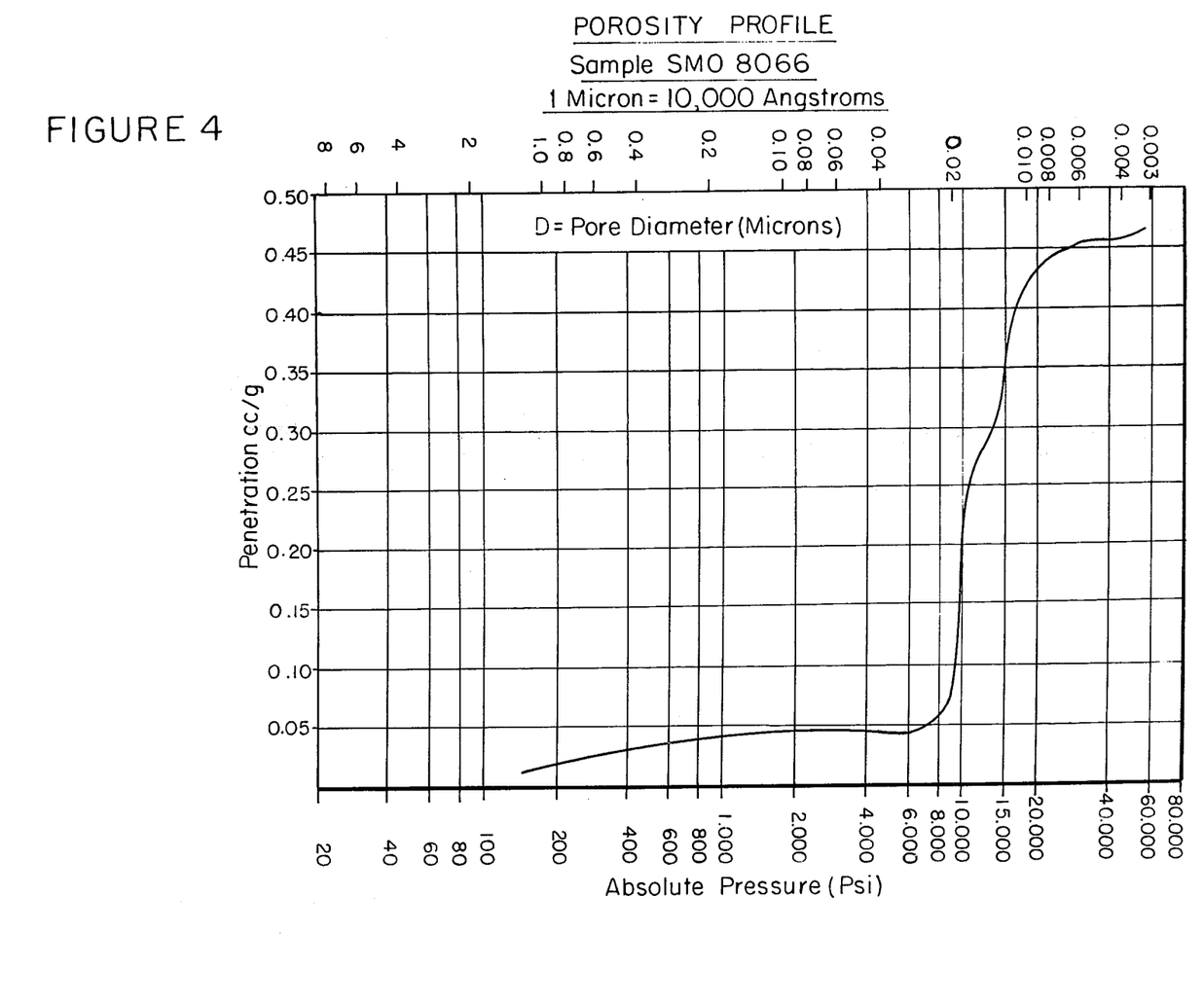
FIG. 4 is a porosity profile of a catalyst of the class of this invention.
Figure 5:
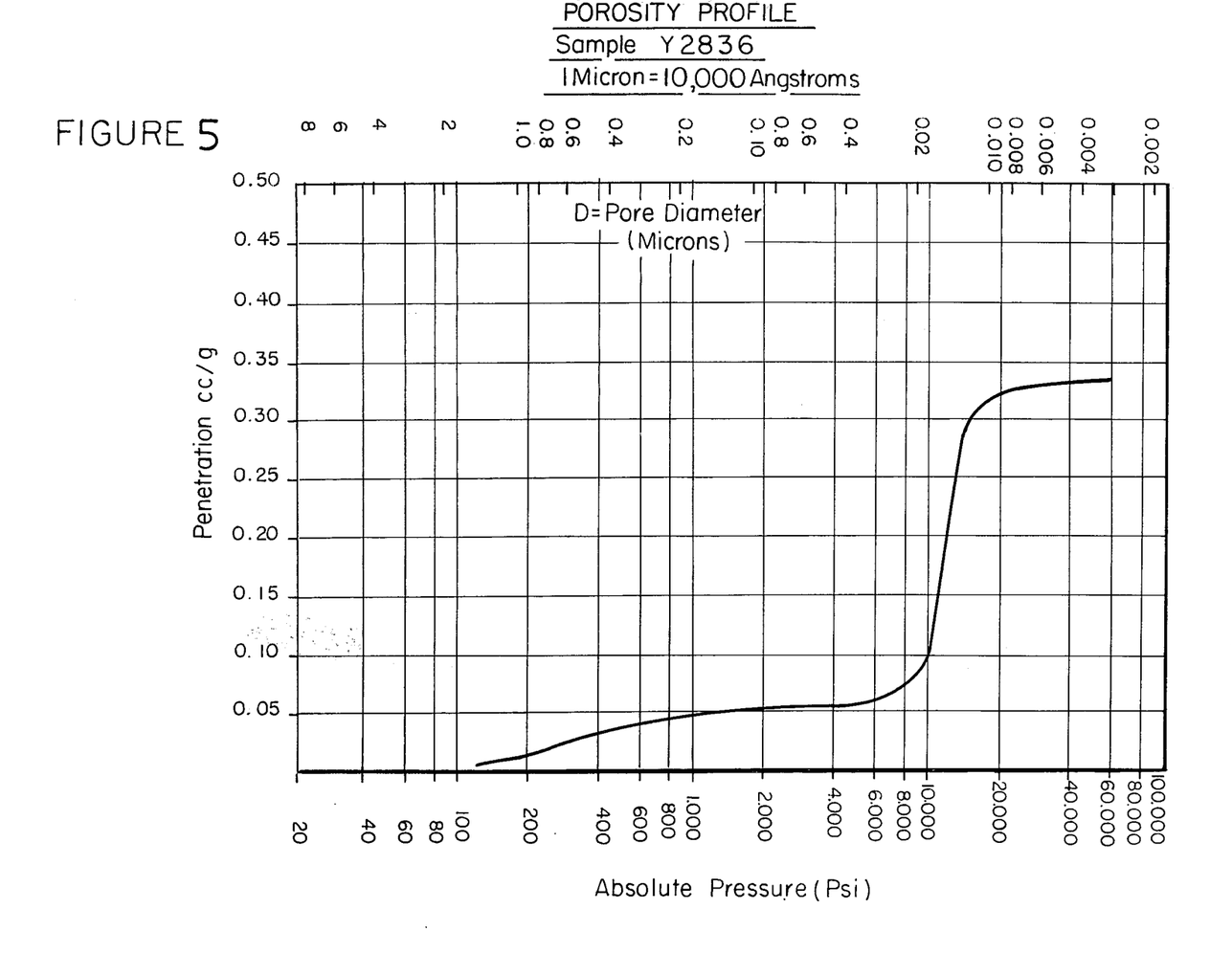
FIG. 5 is a porosity profile of a catalyst of the class of this invention.

Catalysts having a surface area of about 40 to about 150 m$^2$/g performed well. A preferred surface area is less than 110 m$^2$/g. FIGS. 4 and 5 illustrate the porosity profiles of two catalysts of the class of applicants' invention. Such profiles are produced by plotting the amount of a fluid (in this case mercury) in cc/g forced into the pore structure as a function of pressure. As the pressure is increased, the mercury is forced into smaller and smaller pores. As is shown by curves 4 and 5, a dramatic increase in penetration with a small pressure increase indicates that the structure has a large number of pores within a particular size. The specific size is determined by a standard capilliary tube equation calculation.

Figure 1:
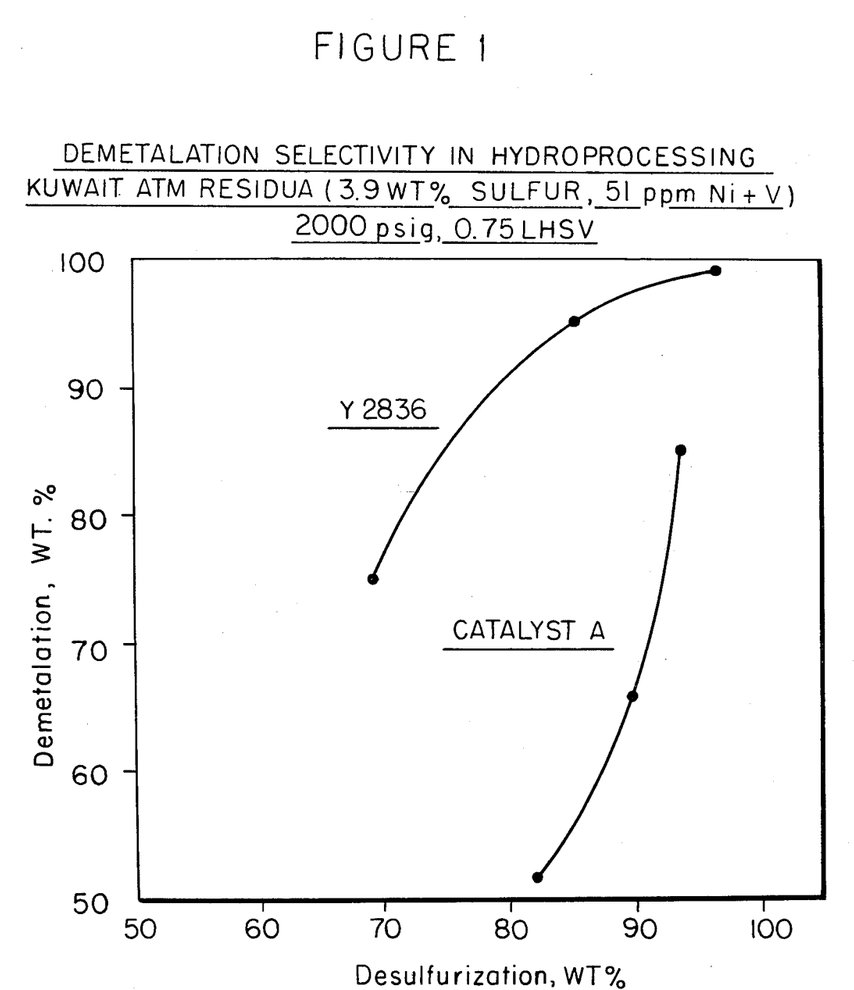
FIG. 1 is a curve showing the demetalation and desulfurization ability of a catalyst of the class according to the present invention as compared with another catalyst now used commercially for demetalation and desulfurization.

As illustrated in FIG. 1, a catalyst of such a class has the ability to dramatically reduce metals content by as much as 98%, while also removing over 90% of the sulfur contaminants.

The catalyst is prepared by impregnating one or more hydrogenating components on a suitable particulate matter refractory base, in a preferred embodiment cobalt and molybdenum on a theta and/or delta phase alumina base. A specific method of preparation is given is Example 4. A particularly suitable particulate material for demetalizing is one which has pores sufficiently large to permit relatively unrestricted movement of the metal complex molecule in and out of the pore as well as decomposition products thereof after deposition of released metal. Solid porous particulate materials which may be used with varying degrees of success for this purpose include relatively large pore silica alumina and silica-magnesia type compositions of little cracking activity, activated carbon, charcoal, petroleum coke, and particularly large pore aluminas or high alumina ores and clays.

Clay supports of particular interest are those known as dickite, halloysite and kaolinite. On the other hand, ores fitting the herein provided physical properties either as existing in their natural or original form or employed with alumina binders or after chemical treatment thereof may also be used as porous support materials in combination with the desired hydrogenation activity herein discussed. By chemical treatment we intend to include acid or caustic treatment as well as treatment with aqueous solutions like sodium aluminate and alumina sulfate containing alumina to increase the alumina content of the support.

The feedstock to be demetalized can be any metal-contaminant containing petroleum stock, preferably one containing residual fractions. A process in accordance with the previously described operating conditions is especially advantageous in connection with chargestocks having a metals factor of greater than about 25.

From what has been said, it will be clear that the feedstock can be a whole crude. However, since the high metal and sulfur components of a crude oil tend to be concentrated in the higher boiling fractions, the present process more commonly will be applied to a bottoms fraction of a petroleum oil, i.e., one which is obtained by atmospheric distillation of a crude petroleum oil to remove lower boiling materials such as naphtha and furnace oil, or by vacuum distillation of an atmospheric residue to remove gas oil. Typical residues to which the present invention is applicable will normally be substantially composed of residual hydrocarbons boiling above 900°F. and containing a substantial quantity of asphaltic materials. Thus, the chargestock can be one having an initial or 5 percent boiling point somewhat below 900°F., provided that a substantial proportion, for example, about 40 or 50 percent by volume, of its hydrocarbon components boil above 900°F. A hydrocarbon stock having a 50 percent boiling point of about 900°F. and which contains asphaltic materials, 4% by weight sulfur and 51 p.p.m. nickel and vanadium is illustrative of such chargestock. Typical process conditions may be defined as contacting a metal and or sulfur contaminant containing chargestock with this invention's catalyst under a hydrogen pressure of about 500 to 3,000 p.s.i.g., of 600 to 850°F. temperature, 0.1 to 5 LHSV.

The hydrogen gas which is used during the hydrodemetalation-hydrodesulfurization is circulated at a rate between about 1,000 and 15,000 s.c.f./bbl. of feed and preferably between about 3,000 and 8,000 s.c.f./bbl. The hydrogen purity may vary from about 60 to 100 percent. If the hydrogen is recycled, which is customary, it is desirable to provide for bleeding off a portion of the recycle gas and to add makeup hydrogen in order to maintain the hydrogen purity within the range specified. Satisfactory removal of hydrogen sulfide from the recycled gas will ordinarily be accomplished by such bleed-off procedures. However, if desired, the recycled gas can be washed with a chemical absorbent for hydrogen sulfide or otherwise treated in known manner to reduce the hydrogen sulfide content thereof prior to recycling.

The invention is especially beneficial where the hydrodemetalation-desulfurization is effected without concomitant cracking of the hydrocarbons present in the feedstock. To achieve this result, the temperature and space velocity are selected within the ranges specified earlier that will result in the reduction of the metals content of the feedstock of about 75 to 98%, preferably over 90%.

The hydrogenating component of the class of catalysts disclosed herein can be any material or combination thereof that is effective to hydrogenate and desulfurize the chargestock under the reaction conditions utilized. For example, the hydrogenating component can be at least one member of the group consisting of Group VI and Group VIII metals in a form capable of promoting hydrogenation reactions, especially effective catalysts for the purposes of this invention are those comprising molybdenum and at least one member of the iron group metals. Preferred catalysts of this class are those containing cobalt and molybdenum, but other combinations of iron group metals and molybdenum such as iron, zinc, nickel and molybdenum, as well as combinations of nickel and molybdenum, cobalt and molybdenum, nickel and tungsten or other Group VI or Group VIII metals of the Periodic Table taken singly or in combination. The hydrogenating components of the catalysts of this invention can be employed in sulfided or unsulfided form.

When the use of a catalyst in sulfided form is desired, the catalyst can be presulfided, after calcination, or calcination and reduction, prior to contact with the chargestock, by contact with a sulfiding mixture of hydrogen and hydrogen sulfide, at a temperature in the range of about 400° to 800°F., at atmospheric or elevated pressures. Presulfiding can be conveniently effected at the beginning of an onstream period at the same conditions to be employed at the start of such period. The exact proportions of hydrogen and hydrogen sulfide are not critical, and mixtures containing low or high proportions of hydrogen sulfide can be used. Relatively low proportions are preferred for economic reasons. When the unused hydrogen and hydrogen sulfide utilized in the presulfiding operation is recycled through the catalyst bed, any water formed during presulfiding is preferably removed prior to recycling through the catalyst bed. It will be understood that elemental sulfur or sulfur compounds, e.g., mercaptans, or carbon desulfide that are capable of yielding hydrogen sulfide at the sulfiding conditions, can be used in lieu of hydrogen sulfide.

Although presulfiding of the catalyst is preferred, it is emphasized that this is not essential as the catalyst will normally become sulfided in a very short time by contact, at the process conditions disclosed herein, with the high sulfur content feedstocks to be used.

The most relevant prior art discovered in the area is that of Beuther et al., U.S. Pat. No. 3,383,301. That patent also deals with demetalation and desulfurization and an alumina base catalyst on which is composited a hydrogenating component, the pore volume of the resultant catalyst having a particular pore size distribution. However, the particular pore size distribution of this disclosure is significantly different from that of Beuther. Not only does that patent not teach or tend to lead one to the catalyst characteristics of this invention, the Beuther et al. disclosure basis of patentability is in fact contrary to that which has been discovered.

While Beuther discloses a desulfurization catalyst "whose pore volume is distributed over (a) wide range of pore sizes," it has been discovered that a catalyst which has its pore volume substantially concentrated in certain narrowly defined sizes produces superior demetalation and desulfurization properties. Beuther teaches that in order to attain such a wide range of pore size, no more than 15% of the volume of the pores should be present in any 10A radius incremental unit in the overall range of 0–300A radius. Not only does the catalyst which has here been discovered have several 10A radius increments having greater than 15% of the pore volume, the catalyst has such large percentage pore size increments adjacent to each other, thus further distinguishing from Beuther's wide pore size range. The catalyst of this invention has over 60% of its pore volume in the narrow range of 50–100A radius (100–200A diameter). Additionally, it has been discovered that if about 10% ±5% of the pore volume is comprised of very large pores (>500A), the catalyst performance is improved. Moreover, it has been discovered that in addition to this large percentage of pore distribution in the 100–200A range, coupled with a small concentration of very large pores (approximately 10%) greater than 500A in diameter, catalyst performance seems to be further improved by about 10% of the pores in the less than 40A diameter range. The catalyst of this invention may be further defined as having a surface area of about 40 to 150 $m^2/g$, and preferably about 110 $m^2/g$ or less, and an average pore diameter of about 150 to 250A diameter. Other somewhat less relevant patents in this general area are listed as follows: Anderson (2,890,162); Erickson (3,242,101); Bertolacini (3,393,148); Roselius (3,684,688); Bertolacini (3,714,032), and Christman (3,730,879). None of these patents teach the particular pore distribution of this disclosure.

While not wishing to be bound by any particular theory of operability, it is felt that the uniqueness of this invention's catalyst is at least due to the fact that the alumina catalyst base is calcined to a particular temperature thereby producing a specific alumina. It is felt that it is this phase which produces the distinct pore size distribution of the catalyst. The particular method of preparation of the catalyst of this invention is explained in detail in Example 4.

As noted in Alumina Properties p.46 by Newsome, Heiser, Russel and Stumpf (Alcoa Research Laboratories 1960), the theta alumina phase may only be reached through employing a alpha monohydrate or a beta trihydrate alumina form. Calcining temperatures required to achieve the theta phase vary depending on which alumina form is utilized as the initial alumina. An alpha monohydrate enters the gamma phase at about 500°C, crosses the transition point into the delta phase at about 860°C and enters the narrowly temperature banded theta phase at about 1,060°C. The transition point between theta and alpha phases being at about 1,150°C.

Figure 6:
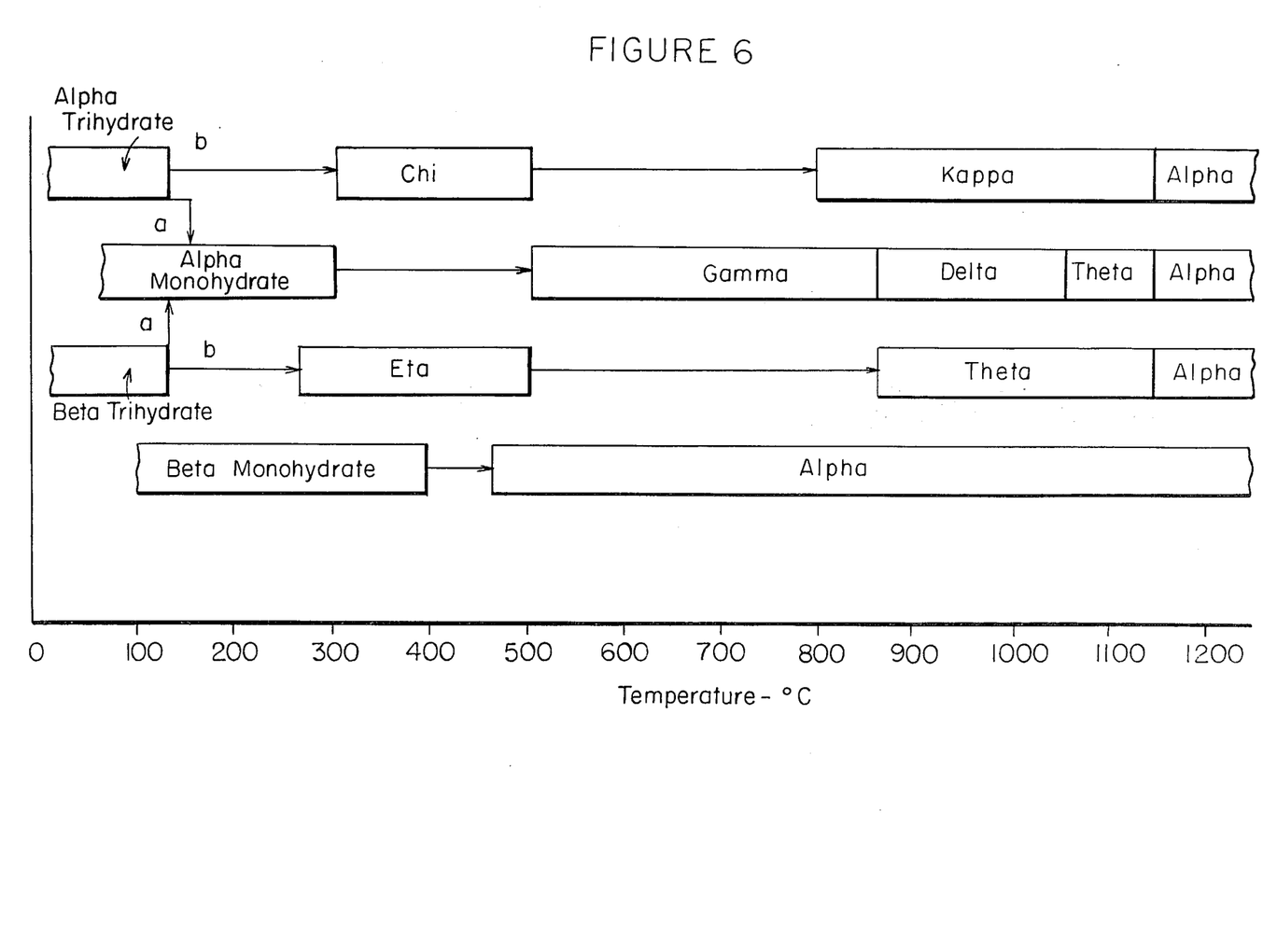
FIG. 6 is an alumina phase diagram.

When utilizing a beta trihydrate as an initial alumina, the theta phase is broader, its limits being about 860°C to about 1,160°C. It should be noted that both beta trihydrate and alpha trihydrate aluminas may also be transformed into the alpha monohydrate form. The alumina phase diagram is presented in FIG. 6.

DESCRIPTION OF SPECIFIC EMBODIMENTS

Examples 1 – 3

In these specific embodiments, two catalysts representative of the class disclosed herein (Examples 2 and 3) were prepared by cobalt-molybdenum deposition on alumina as further described in Example 4. These catalysts were then tested for demetalation and desulfurization ability. Both the physical characteristics of these catalysts and the demetalation-desulfurization activity results are shown in Table 1 as compared with the characteristics and activity of a commercial catalyst (Example 1).

The operating conditions for each of the Examples 1 – 3 comprised 2,000 p.s.i.g. hydrogen pressure, 0.75 LHSV space velocity, 725°F, and 5,000 SCF $H_2$/BBL of residual fraction (Kuwait Atmospheric Residua having 3.54% by weight Sulfur, 12 p.p.m. Ni and 42 p.p.m. V).

Figure 2:
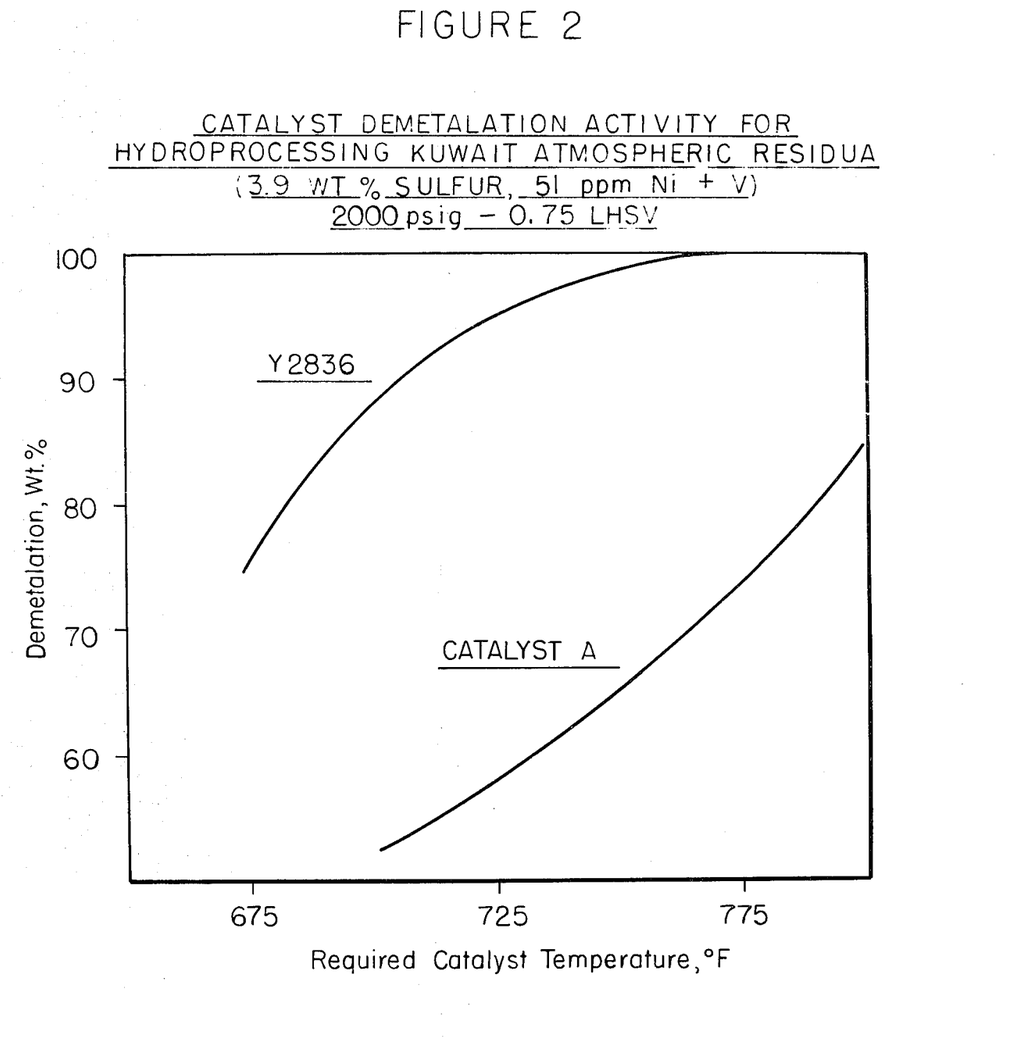
FIG. 2 is a curve showing demetalation activity as a function of temperature for a catalyst of the class of the present invention as compared with another catalyst now used commercially for such a process.
Figure 3:
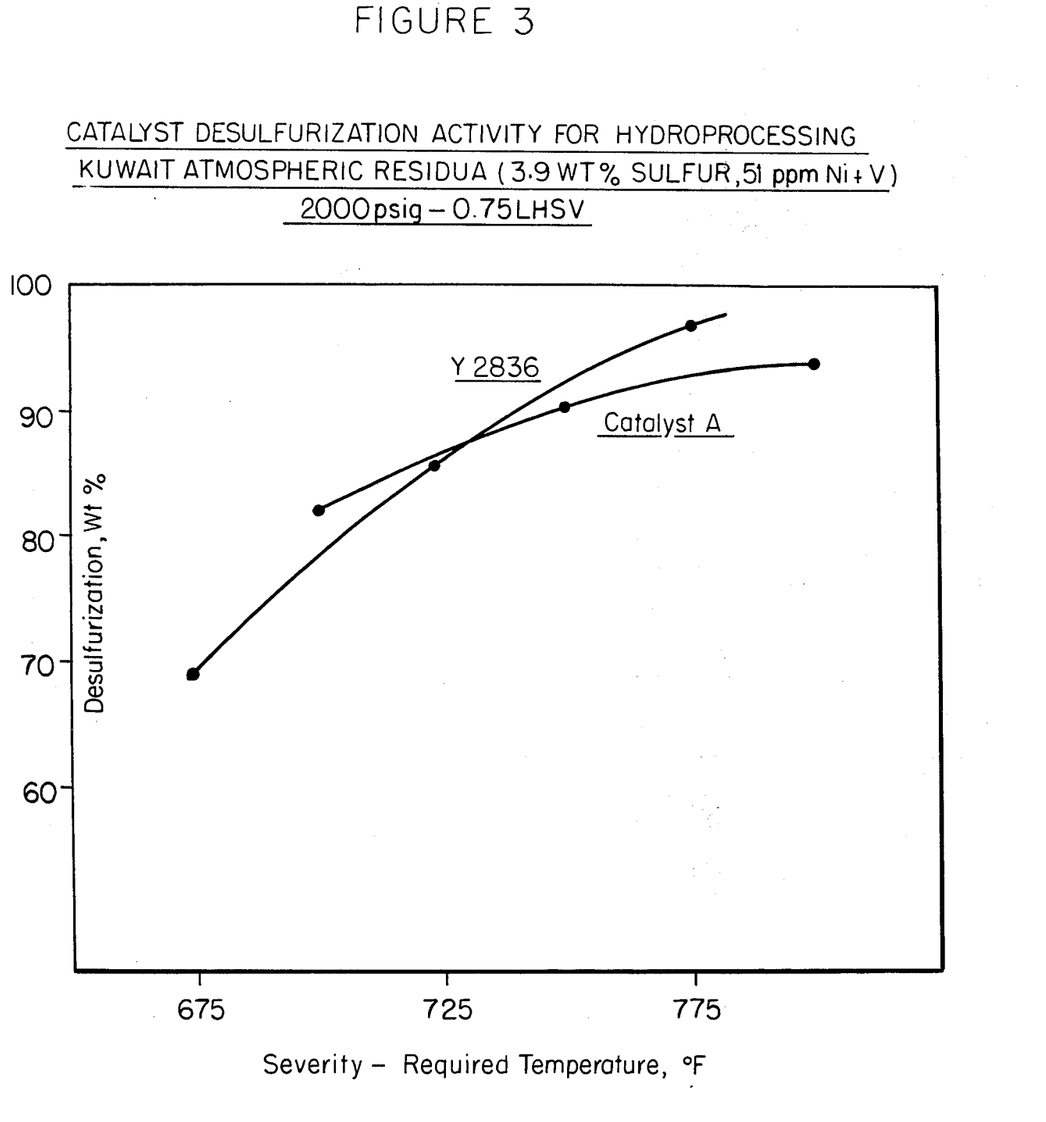
FIG. 3 is a curve showing desulfurization activity as a function of temperature for a catalyst of the class of this invention as compared with another catalyst now used commercially for such a process.

FIGS. 1, 2, and 3 as previously described represent a comparison of the activity of demetalation and desulfurization.

TABLE 1

PROPERTIES AND ACTIVITY OF RESID HYDROPROCESSING CATALYSTS

| Example No. | 1 | 2 | 3 |
|---|---|---|---|
| Catalyst | CATALYST A | Y2836 | SMO-8066 |
| Description | CoMo/$Al_2O_3$ | CoMo/$Al_2O_3$ | CoMo/$Al_2O_3$ |
| Size | 1/32" | 1/32" | 1/32" |
| Properties | | | |
| Surface Area, $m^2/g$ | 286 | 70 | 104 |
| Pore Volume, cc/g | 0.491 | 0.393 | 0.490 |
| Avg. Pore Diam, A | 69 | 225 | 188 |
| Crush Strength, lbs./in. | 76 | 76 | |
| Pore Size Dist.% of total Pore Volume | | | |
| (According to pore Diam in A) | | | |
| 500 + | 2.2 | 14.5 | 8.8 |
| 500 – 400 | 0.0 | 0.3 | 0.4 |
| 400 – 300 | 0.0 | 0.5 | 0.4 |
| 300 – 240 | 0 | 2.5 | 1.0 |
| 240 – 220 | 0 | 1.0 | 0.8 |
| 220 – 200 | 0 | 2.0 | 10.2 |
| 200 – 180 | 0 | 4.6 | 20.8 |
| 180 – 160 | 0 | 15.3 | 11.6 |
| 160 – 140 | 0.2 | 17.8 | 5.1 |
| 140 – 120 | 0.2 | 18.6 | 14.3 |
| 120 – 100 | 1.0 | 4.8 | 12.2 |
| 100 – 80 | 1.0 | 1.5 | 4.7 |
| 80 – 60 | 76.4 | 0.5 | 2.2 |
| 60 – 40 | 6.9 | 0.8 | 0.8 |
| 40 – 0 | 12.0 | 15.3 | 6.5 |
| Activity | | | |
| Desulfurization, wt. % | 85 | 85 | 82 |
| Demetalation, wt. % | 57 | 95 | 90 |
| $H_2$ Consumption, SCF/B | 600 | 490 | — | of Example 1, a catalyst now being used commercially and Example 2, a catalyst of the class of this invention.

Example 4

A preparation procedure for the demetalation-desulfurization class of catalysts of this invention may be defined as follows:

About 525.0 grams of 1/32 extrudate alumina were calcined to a temperature of about 1,950°F thereby transforming the alumina in a particular alumina at about the transition point between delta and theta phases. Water was added to approximately 91.7 grams of ammonium molybdate (about 81.0% $MoO_3$) until a total volume of about 289.0 ml. was reached. This ammonium molybdate solution-water solution was mixed with the alumina which had been placed under a vacuum for about one half hour, and while still under a vacuum was slightly aggitated or rolled for about 5 minutes. The vacuum was removed from the mixture, and 230°F heat was applied for about 4 hours producing a weight loss due to the drying of about 236.9 grams. Water was added to approximately 69.4 grams of $CoCl_2 \cdot 6 H_2O$ (about 99.0% purity) until a total volume of about 239.0 ml. was reached. This cobalt chloride-water solution was mixed with the molybdenum vacuum impregnated alumina and placed under a vacuum for about one half hour, and while still under a vacuum, was slightly aggitated for about 5 minutes. The vacuum was removed from the mixture, and 230°F heat was applied for about ten hours. Finally the cobaltmolybdenum impregnated alumina was calcined to about 1,000°F at a gradually increasing rate of approximately 2°F/min., and held at 1,000°F for about 10 hours.

What is claimed is:

1. In the process for purifying residual petroleum oil comprising demetalizing and desulfurizing said oil in contact with hydrogen and with an alumina base catalyst incorporating a Group VI-B and a Group VIII metal; the improvement which comprises said catalyst having at least about 60% of its pore volume contributed by pores having diameters in the range of about 100 to 200A; at least about 5% of its pore volume contributed by pores having diameters greater than 500A; at least about 5% of its pore volume contributed by pores having diameters less than 40A; and having a surface area of up to about 110$m^2$/g.

2. The process as claimed in claim 1 wherein said contacting is carried out at a hydrogen pressure of about 500 to 3,000 p.s.i.g., a temperature of about 600° to about 850°F and a space velocity of about 0.1 to 5 LHSV.

3. The process as claimed in claim 2 wherein said demetalized and desulfurized oil is passed to a cracking step, said cracking being carried out under the following conditions: 800° to 1,500°F temperature, 1 to 5 atmospheres pressure, and a space velocity of about 1 to 1000 WHSV.

4. The process as claimed in claim 2 wherein said demetalized and desulfurized oil is passed to a hydrocracking step, said hydrocracking being carried out under the following conditions: 400° to 1,000°F temperature and 100 to 3,500 p.s.i.g. pressure.

5. The process as claimed in claim 2 wherein said demetalized and desulfurized oil is passed to a coking step, said coking being carried out under the following conditions: 800° to 1100°F temperature and one to ten atmospheres pressure.

6. The process as claimed in claim 1 wherein said contacting occurs at the following conditions:
A hydrogen pressure of 2,000 to 3,000 p.s.i.g., a temperature of about 725° to 850°F and a space velocity of about 0.10 to 1.5.

7. The process as claimed in claim 6 wherein said demetalized and desulfurized oil is passed to a coking step, said coking being carried out under the following conditions: 800° to 1,100°F temperature and 1 to 10 atmospheres pressure.

* * * * *